United States Patent [19]

Sakashita

[11] Patent Number: 4,466,019
[45] Date of Patent: Aug. 14, 1984

[54] CAMERA LENS ATTACHMENT MECHANISM

[75] Inventor: Akio Sakashita, Atsugi, Japan

[73] Assignee: Sony Corporation, Tokyo, Japan

[21] Appl. No.: 360,931

[22] Filed: Mar. 23, 1982

[30] Foreign Application Priority Data

Mar. 25, 1981 [JP] Japan .............................. 56-41967[U]

[51] Int. Cl.³ ......................... H04N 5/26; G03B 17/14
[52] U.S. Cl. .................................... 358/229; 358/225; 354/286
[58] Field of Search .......................... 358/225, 55, 229; 354/286, 190, 193

[56] References Cited

U.S. PATENT DOCUMENTS

| 4,030,113 | 1/1977 | Obreschkow | 354/286 |
| 4,104,649 | 8/1978 | Tanaka | 354/286 |
| 4,318,133 | 3/1982 | Ohtake | 358/229 |
| 4,326,784 | 4/1982 | Ichiyanagi | 354/286 |

FOREIGN PATENT DOCUMENTS

| 712920 | 10/1931 | France | 354/286 |
| 69986 | 4/1982 | Japan | 358/225 |

Primary Examiner—Tommy P. Chin
Attorney, Agent, or Firm—Hill, Van Santen, Steadman & Simpson

[57] ABSTRACT

A lens apparatus suitable for use with a video camera body, comprises a lens body, an attachment surface formed at a rear end portion of the lens body and serving as a flange back reference surface, a base member projecting rearwards from the attachment surface, a movable electrical terminal provided on the base member and biased rearwards for engagement with a fixed terminal on the video camera body, and a positioning recess formed on the base member for engagement with a positioning projection on the video camera body.

2 Claims, 7 Drawing Figures

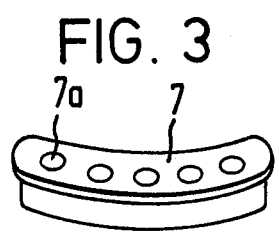
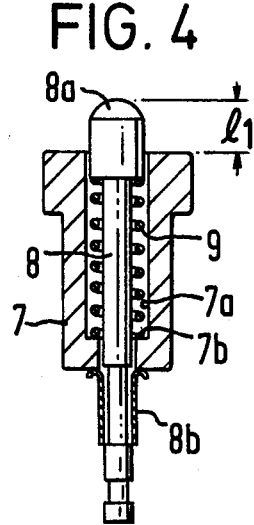
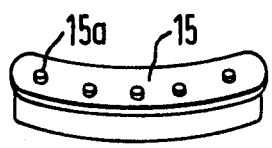
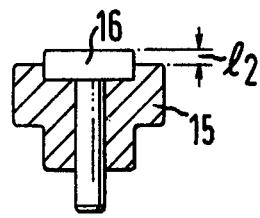
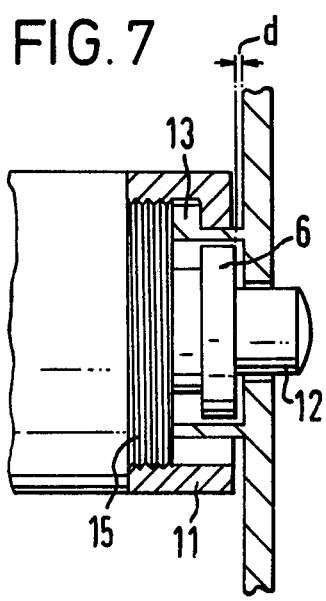

CAMERA LENS ATTACHMENT MECHANISM

BACKGROUND OF THE INVENTION

1. Field of the Invention

This invention relates to lens apparatus, and more particularly, but not exclusively, to lens apparatus suitable for use with a video camera body, and to such lens apparatus in combination with a video camera body.

2. Description of the Prior Art

In a video camera, a video camera body and a lens apparatus thereof are electrically coupled by a cable. The cable is necessary in particular because at least one motor is provided in the lens apparatus for effecting iris control and zooming, for both of which purposes a control signal and power have to be supplied from the camera. In addition, a control signal such as a return video control signal (which is a control signal for observing in the viewfinder of the camera an image recorded by a video tape recorder) based upon the operation of an operating member provided in the lens apparatus may be supplied to the video camera body.

In prior video cameras, the above-mentioned cable is connected at a position different from the position where the lens apparatus is coupled to the video camera body, so that the cable is external to both the video camera body and to the lens apparatus. In consequence, the cable may become snagged and disconnected by an external force applied thereto.

One object of the present invention is to provide a lens apparatus having provision for internal electrical connections.

Another object of the present invention is to provide a lens apparatus in which electrical connections are made automatically when the lens apparatus is coupled to a camera body.

Another object of the present invention is to provide a video camera which does not require an external electrical cable to couple a lens apparatus to the body of the video camera.

SUMMARY OF THE INVENTION

According to the present invention there is provided a lens apparatus comprising a lens body having a rear end portion, an attachment surface formed at said rear end portion of said lens body and serving as a flange back reference surface, a base member projecting rearwards from said attachment surface, a movable electrical terminal provided on said base member and biased rearwards, and a positioning means formed on said base member.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3 to 7 are detailed diagrams used to explain the embodiment of FIG. 1.

DESCRIPTION OF THE PREFERRED EMBODIMENTS

In the embodiment to be described, the lens apparatus is attached to a video camera by way of example.

Figure 1:
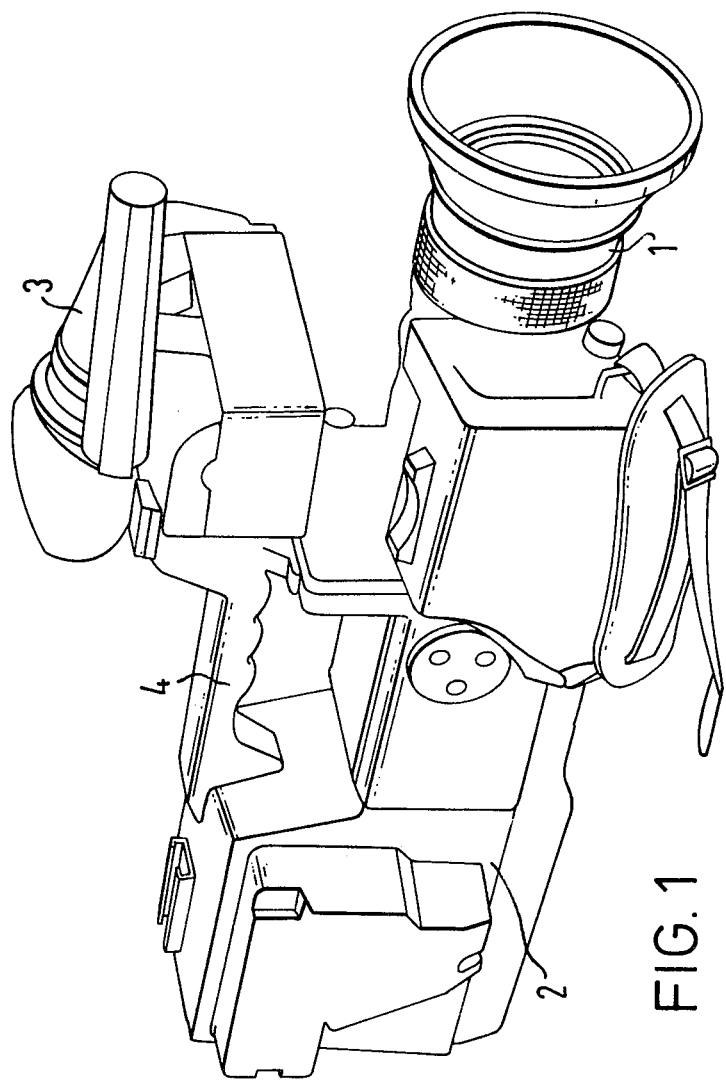
FIG. 1 is a perspective view of an embodiment of lens apparatus according to the invention mounted on a video cameral body.

Referring to FIG. 1, a lens apparatus according to the invention and comprising a lens body 1 is attached to a video camera body 2 by a bayonet system as will be described later in connection with FIG. 2. A viewfinder 3 is also attached to the video camera body 2 adjacent to a carrying handle 4. Although not referred to in detail herein, operating members are provided for controlling the zoom, iris and so on of the lens apparatus.

Figure 2:
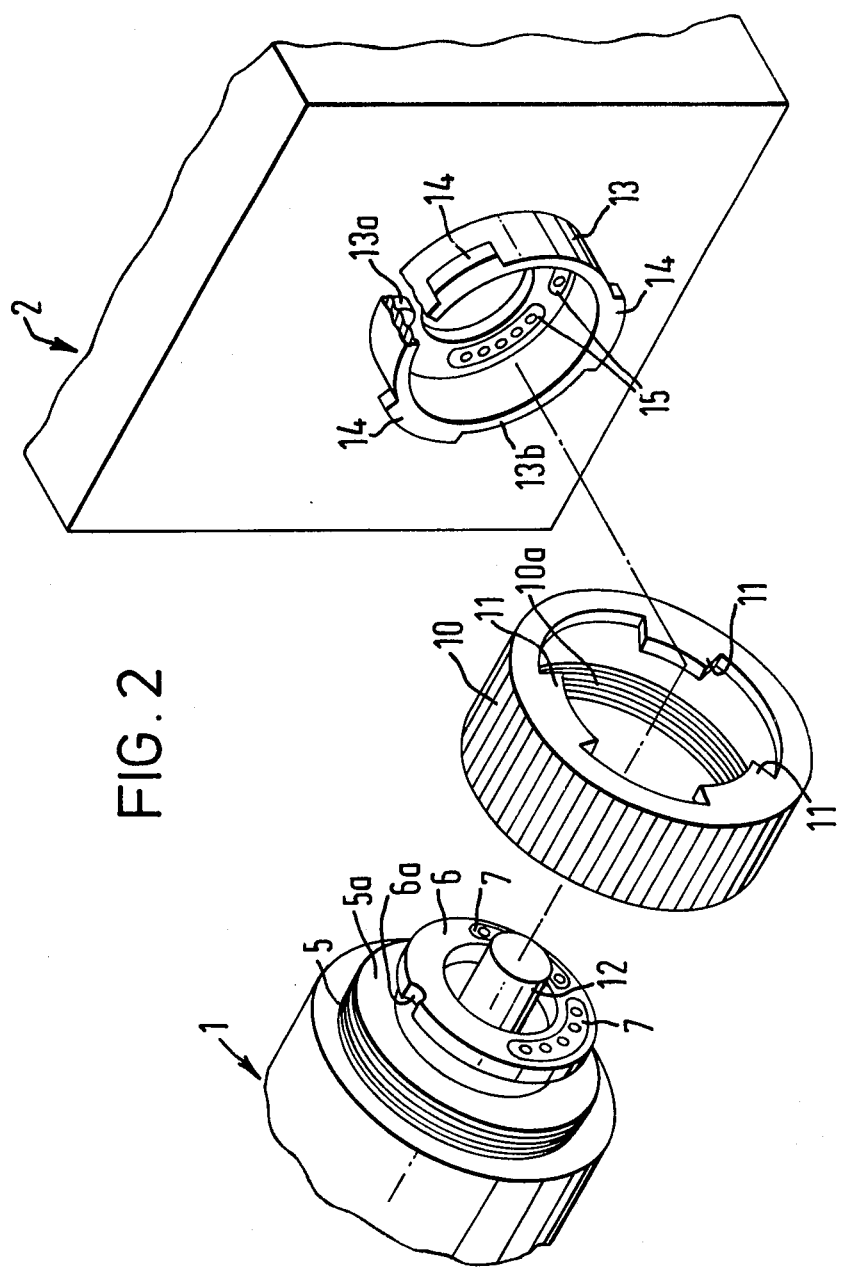
FIG. 2 is an exploded view showing part of the embodiment of FIG. 1.

FIG. 2 shows the respective attachment portions of the lens body 1 and the video camera body 2. In the illustrated embodiment, an externally threaded portion 5 is provided on the rear end surface of the lens body 1 and an attachment surface 5a is formed on the free end of the externally threaded portion 5. The attachment surface 5a serves as a reference surface for the flange back distance and is selected to be perpendicular to the axis of the lens body 1. An annular terminal base 6 is provided on the rear end of the lens body 1, the terminal base 6 protruding rearwards beyond the attachment surface 5a. On the terminal base 6 there are provided a positioning recess or cut-out portion 6a and two terminal plates 7.

As shown in FIG. 3, each of the terminal plates 7 is generally arcuate in shape and five apertures 7a are formed through each of the terminal plates 7. An electrical terminal 8 is inserted into each of the apertures 7a as shown in FIG. 4. A compressed coil spring 9 is located within the aperture 7a around the terminal 8 between an upper enlarged portion 8a of the terminal 8 and a bottom portion 7b of the aperture 7a, and a stop 8b formed as an eyelet is attached to the lower end of the terminal 8, as shown in FIG. 4.

As shown in FIG. 2, a cylindrical lock ring 10 is provided with internal threads 10a on its inner surface at one end portion thereof. The internal threads 10a can engage with the threads of the externally threaded member 5. On the other end portion of the lock ring 10 are formed three engaging members 11 which each extend inwardly in the radial direction of the lock ring 10 and are spaced at equal angular distances. A master lens system 12 extends into the lens body 1.

Also, as shown in FIG. 2, a cylindrical member 13 is fixed to the video camera body 2. On the outer periphery of the free end of the cylindrical member 13 are provided three engaging members 14 in correspondence with three engaging members 11 of the lock ring 10 and spaced at equal angular distances, each of the three engaging members 14 extending outwardly in the radial direction of the cylindrical member 13. A positioning projection 13a is formed on the inner peripheral surface of the cylindrical member 13 which will engage with the positioning recess 6a of the terminal base 6.

On the bottom of the cylindrical member 13 are provided two terminal plates 15 which are located in correspondence with the terminal plates 7 of the terminal base 6. In other words, when the positioning projection 13a is engaged with the positioning recess 6a of the terminal base 6 to position the terminal base 6 relative to the cylindrical member 13, the terminal plates 7 coincide in position with the terminal plates 15.

As shown in FIG. 5, each of the terminal plates 15 is generally arcuate in shape and is bored therethrough with five apertures 15a. A pinshaped electrical terminal 16 is fixedly inserted into each of the apertures 15 as shown in FIG. 6.

The projecting length $l_2$ of the terminal 16 from the free surface of the terminal plate 15 and the projecting length $l_1$ of the terminal 8 from the free surface of the terminal plate 7 when the terminal 8 is biased by the spring 9 are selected as follows. If the distance between the free surface of the terminal base 6 and the opposing surface of the cylindrical member 13 is taken as d when the lens body 1 is mounted on the video camera body 2 as shown in FIG. 7, the above lengths and distance are selected to satisfy the following condition:

$l_1 + l_2$ is greater than d is greater than $l_2$

With the above arrangement, in order to attach the lens body 1 to the video camera body 2, the lock ring 10 is first loosely screwed onto the externally threaded portion 5 of the lens body 1 by its internal threads 10a, and then the rear end of the lens body 1 is engaged with the cylindrical member 13 of the video camera body 2. At this time, the rotational angle of the lock ring 10 is so adjusted that the engaging members 11 of the lock ring 10 are prevented from abutting against the engaging members 14 of the cylindrical member 13, so that the above-mentioned engagement can be carried out smoothly. Moreover, the positioning recess 6a of the terminal base 6 is engaged with the positioning projection 13a of the cylindrical member 13, so that the two terminal plates 7 and 15 face each other. Finally, a free end surface 13b of the cylindrical member 13 abuts against the attachment surface 5a of the externally threaded member 5.

After the rear end of the lens body 1 has been engaged with the cylindrical member 13 of the video camera body 2 as described above, the lock ring 10 is firmly screwed onto the externally threaded portion 5. Thus, the lock ring 10 moves towards the lens body 1 and at the same time the engaging members 11 thereof overlap with the engaging members 14 of the cylindrical member 13. Accordingly, by the cooperation of the attachment surface 5a of the externally threaded portion 5 and the engaging members 11 of the lock ring 10, the engaging members 14 of the cylindrical member 13 are gripped therebetween. As a result, the attachment surface 5a of the externally threaded portion 5 is positively abutted on the free end surface 13b of the cylindrical member 13.

At this time, the distance d between the free surface of the terminal base 6 and the bottom surface of the cylindrical member 13 (FIG. 7) satisfies the above condition:

$l_1 + l_2$ is greater than d is greater than $l_2$

As a result, the terminals 8 and 16 are positively contacted with each other to establish the electrical connection therebetween and at the same time (since $l_1 + l_2$ is greater than d), the terminal 16 directly abuts the surface of the terminal base 6 so that the free end surface 13b of the cylindrical member 13 is prevented from coming apart from the attachment surface 5a of the externally threaded portion 5 with consequent displacement of the flange back distance or deviation of the optical axis (since d is greater than $l_2$).

The arrangement is such that there is a water-resistant effect. Thus, because the terminal base 6 projects rearwards from the attachment surface 5a of the externally threaded portion 5, the engagement of the positioning recess 6a of the terminal base 6 with the positioning projection 13a of the cylindrical member 13 is performed within the cylindrical member 13. In this case, the inside of the cylindrical member 13 is sealed by the firm abutment of the attachment surface 5a with the free end surface 13a of the cylindrical member 13 and also by the lock ring 10. Accordingly, even if any gap or clearance is generated at the engaging position between the positioning recess 6a and the positioning projection 13a, there is no risk of water penetrating into the lens apparatus 1 and the video camera body 2.

When the lens body 1 is assembled to the video camera body 2, the terminal 8 of the lens apparatus 1 is urged against the terminal 16 of the video camera body 2, so it is not necessary to provide an external cable.

Moreover, since the attachment surface 5a serving as the reference surface for the flange back distance is provided separately from the terminal base 6, it is not necessary for the terminal base 6 to abut on the bottom surface of the cylindrical member 13 for setting the flange back distance. Therefore, the contact between the terminals 8 and 16 is maintained simply by the action of the spring 9. Accordingly, the bottom surface of the cylindrical member 13 does not directly contact with the terminal base 6, so the attachment surface 5a does not come apart from the free end surface 13b of the cylindrical member 13. As a result, the flange back distance and the optical axis are not displaced.

Also, since the terminal base 6 projects rearwards from the attachment surface 5a, no water can penetrate through the engaged portion of the positioning recess 6a with the positioning projection 13a into the inside of the lock ring 10.

Although the terminal 8 requires a relatively large space due to the fact that it projects and also requires the spring 9, the terminal 8 can easily be assembled by locating the terminal 8 at the terminal base 6, that is on the lens body 1. A colour temperature compensating filter (not shown) is generally provided not on the lens body 1 but on the video camera body 2, to avoid the expense of a temperature compensating filter on each interchangeable lens body 1. There is therefore a margin of space at the rear of the lens body 1, because there is no colour temperature compensating filter, and the projecting terminals 8 occupy this space.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A lens apparatus comprising a generally cylindrical lens body having a rear end portion, an attachment surface formed at said rear end portion of said lens body and serving as a flange back reference surface, a base member projecting in the rearward direction from said attachment surface, a movable electrical terminal provided on said base member and biased in the rearward direction, and a first positioning means for establishing the peripheral location of said terminal formed on said base member, in combination with a video camera body, said video camera body comprising a forwardly-projecting cylindrical member having a free end surface abutting said attachment surface, a fixed electrical terminal engaging said movable electrical terminal, and a second positioning means engaging and cooperating with said first positioning means to prevent relative rotation between said lens body and said video camera body, said combination further comprising a lock ring to hold said lens body on said video camera body.

2. A combination according to claim 1 wherein said lock ring has inwardly projecting engaging members engaged with and in the rearward direction of outwardly projecting engaging members on said cylindrical member, and has internal threads engaged with external threads on said lens body.

* * * * *